Jan. 26, 1943.    F. McGUIRE, JR    2,309,128
HEATING METHOD AND APPARATUS
Filed Jan. 17, 1942
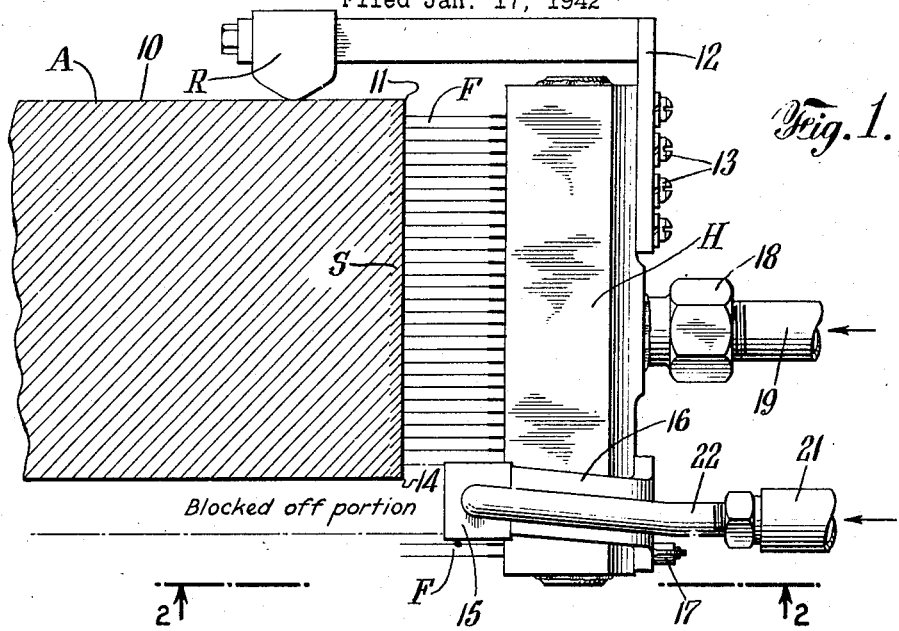
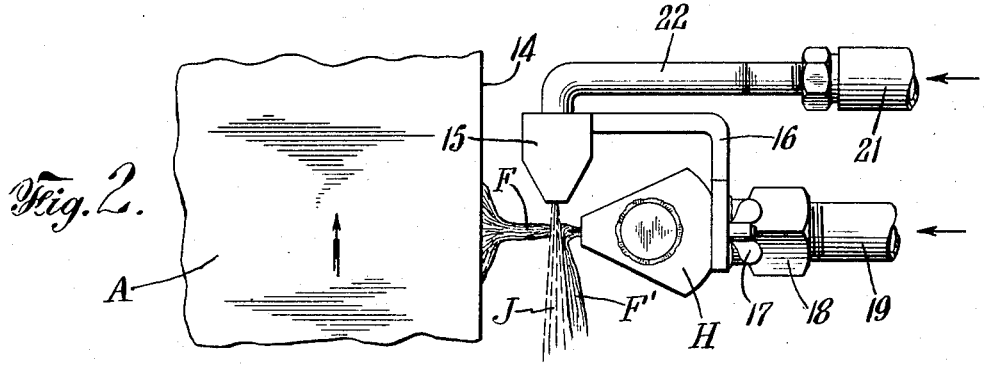
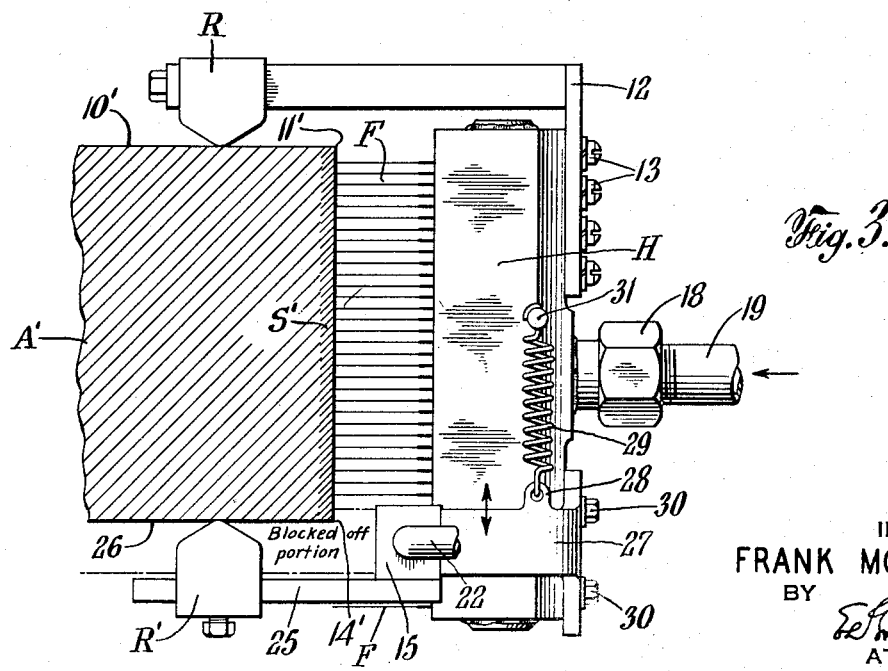
INVENTOR
FRANK MCGUIRE, JR.
BY
ATTORNEY Patented Jan. 26, 1943

2,309,128

UNITED STATES PATENT OFFICE 2,309,128

HEATING METHOD AND APPARATUS

Frank McGuire, Jr., Chicago, Ill., assignor to The Linde Air Products Company, a corporation of Ohio Application January 17, 1942, Serial No. 427,148

10 Claims. (Cl. 148—21.5)

This invention relates to a method of and apparatus for heating surfaces having different widths. As used herein and in the appended claims, "surfaces having different widths" refers both to a plurality of surfaces having widths which differ from each other, and a single surface having a varying width, or a plurality of such surfaces.

The method and apparatus of this invention are particularly useful in heat treating, by flame softening, surfaces exposed as the result of the thermochemical removal of metal or severing of a metal body by a jet or jets of oxygen, which removal or severing often leaves the exposed metal objectionably hard and brittle. However, the method and apparatus of this invention are also useful in other heating operations, such as flame hardening.

When a metal body composed of hardenable steel or the like is severed by a jet of oxygen, the resulting surface or sides of the cut or kerf become hardened, due to relatively rapid cooling of a surface layer from a temperature considerably above the critical. If such a surface is to be machined, the hardness—which may be as high as 600 Brinell—requires harder tools, increases power costs and tool breakage, and sometimes is an almost insurmountable difficulty. Also, if the article is to be used as a machine part, or for some other reason the cut suface will be subject to tension stresses of repeated stress reversals, the lack of ductility of the hard, brittle cut surface becomes objectionable. By heat treatment, the brittleness of the cut surface may be reduced and the ductility restored or increased a desired amount.

Such heat treatment may be accomplished in a convenient and highly satisfactory manner through locally reheating the surface to a desired temperature by applying a plurality of heating flames to successive portions of the surface, which heated portions normally cool in air. For best results, it is usually desirable that the heating flames be relatively small, be spaced closely together, and be aligned in one or more rows disposed transversely to the surface. To prevent the relatively sharp cut edges from becoming heated to a hardening temperature and thus be rehardened, it is desirable to space the heating flames slightly from each edge. Of course, a different heating head can be made for each width of surface, where the surfaces are of different widths, but such an expedient is normally costly and necessitates carrying a considerable number of heads in stock. Also, when the width of the cut surface varies, it is of little benefit to have a plurality of heads of different widths, and an expedient resorted to in the past is to use a head producing heating flames which extend across the narrowest portion of the surface. The surface is traversed by the heating head in two or more passes. In the first pass, the head is guided along one edge, such as the top, and the surface is then allowed to cool; in the second pass, the head is guided along the opposite edge, such as the bottom; and, after the surface again cools, a subsequent pass, necessary only if the surface is wider at any point than twice the effective width of the head, covers the central untreated portion lying between the first and second passes. The principal disadvantage of this procedure is the excessive amount of time consumed in making three passes and in permitting the surface to cool between each pass.

Another situation requiring different widths of effective flame coverage is the case of bevel cut surfaces having the same width but different angles of cut. Since a sharper edge tends to become overheated more readily, the end of the row of flames should be spaced a greater distance from the sharp edge of such a surface than from the edge of a surface cut at an angle more nearly perpendicular. Thus, for slightly different angles of cuts producing surfaces having substantially the same dimensional width, an almost infinite variety of effective flame coverages is necessary.

Among the objects of this invention are: to provide a novel method of heating surfaces of varying or different widths by a plurality or series of closely spaced high temperature heating flames or the equivalent thereof; to provide a method of heating surfaces of different or varying widths wherein the effective surface coverage of a plurality or series of high temperature heating flames may be varied as desired; to provide such a method wherein successive longitudinal portions of a surface are heated by a row of heating flames disposed transversely and extending substantially across the width of such surface; to provide apparatus effective to carry out the above method; to provide such apparatus which includes normally only a single heating head; and to provide such apparatus wherein the effective surface coverage of a row of high temperature heating flames is substantially automatically varied in accordance with the width of surface along which the flames are traversed. Other objects and novel features of this invention will become apparent from the following description and the accompanying drawing. In the drawing:

Fig. 1 is a vertical sectional view of an article, a surface of which is being heated by apparatus constructed in accordance with this invention;

Fig. 2 is a bottom view, looking upwardly, of the article and apparatus of Fig. 1; and Fig. 3 is a vertical sectional view, similar to Fig. 1, of an article and a substantially automatic apparatus constituting a modification of the apparatus of Fig. 1, for use particularly when the width of the surface varies.

In accordance with this invention, surfaces having different or varying widths are heated by applying a plurality of closely spaced. heating flames or the equivalent to successive portions thereof; and directing a jet of suitable gaseous fluid, such as air, at a sufficient angle to the heating flames which would otherwise overheat an edge of the surface or apply heat at a place not desired, to blow such heating flames away from such edge or other place. Preferably, one end of a row of high temperature heating flames is guided along one edge of the surface, being spaced slightly from the edge at a sufficient distance to prevent overheating the edge, while the row of flames is moved longitudinally along the surface and maintained in a position substantially transverse to, or across the width of, the surface. At the same time, a jet of air is directed perpendicularly to the flames, at a point closer to the heating head than the surface being treated, but preferably against the outer envelope of the flames. The air jet is positioned sufficiently over the opposite edge of the surface, and extends a sufficient distance away from the surface, to blow the outer envelope of a sufficient number of the flames away from the edge of the surface to prevent the edge from becoming overheated.

The heating method of this invention is particularly useful in treating flame cut surfaces, and apparatus constructed in accordance with this invention, as shown in Figs. 1 and 2, is utilized in treating a flame-cut and hard surface S of an article A. From a heating head H, a row of high temperature heating flames F are directed against the surface S, successive longitudinal portions of the surface being heated as head H is moved in the direction of the arrow of Fig. 2. Head H and the row of flames F are maintained in a position transverse to the surface, head H being mounted on a suitable traversing mechanism, and supported by a hinged or pivoted bracket so that it floats, as it were. Head H may be accurately guided and partially supported by a rider R which engages the top surface 10 of article A, to maintain the upper end of the row of flames F in desired position, spaced slightly from the upper edge 11 of surface S. Rider R is mounted on an angle bracket 12 secured to head H by bolts 13, and the leg of bracket 12 through which bolts 13 pass may be slotted, so that the relative position of the rider with respect to head H may be adjusted.

At the opposite or lower edge 14 of surface S, an air jet J is directed perpendicularly to flames F, to blow the outer envelopes of flames F' away from edge 14. Jet J extends for a sufficient distance below edge 14 to blow away all flames which might otherwise tend to cause edge 14 to become overheated. The flames may be blown in a perpendicular direction, as shown in Fig. 2, though other angles may be found suitable in many instances. Also, though surface S is shown in the drawing as being vertical, the surface being treated may be in any other position.

Jet J is discharged from an air head 15, which is supported by an angle bracket 16, one leg of which is slotted so that the bracket is adjustable with respect to head H through a bolt having a wing nut 17. The bolt passes through the slot and the wing nut is tightened to secure the air head in any desired position—this construction being particularly useful when surfaces of different widths are treated in succession, since one setting will suffice for each surface or group of identical surfaces.

Inlet connection 18 of heating head H is rigid, as is inlet pipe 19, by which head H is supported. A combustible mixture of gases is supplied head H through pipe 19 from any suitable mixing device, such as in a blowpipe body. The row of outlets, through which the combustible mixture jets forming heating flames F are discharged, may be drilled in the face of head H, or formed in any other suitable manner. The outlet in head 15 for air jet J may be long and narrow, or comprise a plurality of closely spaced, smaller outlets. Head 15 is supplied with air or other suitable gaseous fluid under pressure through a flexible hose 21, leading to an air inlet connection 22.

When the surfaces to be treated vary in width, apparatus as shown in Fig. 3 is particularly useful. This apparatus is similar to the apparatus of Figs. 1 and 2, in that a row of flames F are directed against a surface S' of an article A' from a heating head H. A rider R follows the top surface 10' of article A', so that the upper end of the row of flames will follow the contour of, and remain spaced relatively to, edge 11' of surface S'. However, since surface S' varies in width, the position of air head 15 and air jet J should be varied in accordance therewith, so a rider R' is adjustably secured adjacent one end of an arm 25, the arm being attached at its other end to head 15. Rider R' follows the contour of lower surface 26 of article A', and maintains the air jet in the desired relation to lower edge 14'. Air head 15 is supported by a bracket 27, one leg of which is attached to head 15 and which leg is provided with an ear 28 to permit attachment of a tension spring 29. The other leg of bracket 27 is provided with a slot through which bolts 30 extend, for guiding air head 15 and maintaining the air jet in the desired relation to the heating flames. Spring 29 is stretched between ear 28 and a button or pin 31 formed on or attached to head H, and maintains rider R' in engagement with bottom surface 26 of the article.

As will be evident, as rider R follows the top surface 10' and rider R' follows the bottom surface 26 of the article, the number of heating flames, i. e. extent of flame coverage, will vary in accordance with variations in width of surface S'. Thus, only a single pass is normally necessary to treat a surface of varying width and a considerable saving in time as well as heating gases consumed is accomplished. The loss due to flames blown away at the lower edge and flames below the air jet is relatively small compared with the cost of reheating a surface, or considerable portions thereof, several times. In addition, the loss in the flames blown away or not applied to the surface where surfaces of different widths are treated, as in Fig. 1, is relatively small compared with the cost of keeping a large variety of heads in stock.

From the foregoing, it will be seen that the method and apparatus of this invention overcome, in a relatively simple, efficacious and highly satisfactory manner, the problems involved in treating surfaces of differing and/or varying width, particularly by varying the effective flame coverage of a series or plurality of heating flames. Although this invention has been described with respect to the use of a row or series of heating flames, instances may arise in which a single, relatively wide ribbon-like heating flame is utilized. It will be understood that the principles of this invention are applicable to such cases, particularly when the air or gaseous fluid jet is directed against the outer envelope of the flame, and that therefore a ribbon type flame comes within the scope of the appended claims which refer to a plurality or row of heating flames. In addition, although different modifications of the apparatus of this invention have been described, it will be understood that other modifications are possible, and that various changes—in both the method and apparatus of this invention—may be made without departing from the spirit and scope of this invention.

What is claimed is:

1. In a method of heating a surface by applying a plurality of heating flames to successive portions of said surface, wherein said flames extend from a point adjacent one edge of said surface to a point normally beyond the opposite edge of said surface, the improvement which comprises directing a jet of gaseous fluid at an angle to the flames adjacent said opposite edge to blow away from said edge the flames tending to overheat said opposite edge.

2. In a method of heating surfaces of differing widths by applying a plurality of heating flames to successive portions of said surface, wherein said flames are disposed in a row extending transversely of said surface from a point closely adjacent one edge of said surface to a point normally beyond the opposite edge of said surface, the improvement which comprises directing a jet of gaseous fluid substantially perpendicularly to the flames and adjacent said opposite edge to blow away the flames tending to overheat said opposite edge; maintaining one end of said row of flames spaced slightly from one edge of said surface to prevent overheating said edge; and maintaining said gaseous fluid jet in a position corresponding to the opposite edge of said surface.

3. In a method of heating a surface as defined in claim 2, in which one end of said row is maintained spaced slightly from one edge of said surface by effecting a relative movement between said flames and said surface to cause said flames to follow the contour of said edge, and said gaseous fluid jet is maintained in a position corresponding to the opposite edge of said surface by effecting a relative movement between said surface and said jet to cause said jet to follow the contour of said opposite edge.

4. Apparatus for heating surfaces of differing widths including means for applying a plurality of heating flames to successive portions of said surface, said flames extending from a point closely adjacent one edge of said surface to a point normally beyond the opposite edge of said surface; and means for directing a jet of gaseous fluid at an angle to the flames adjacent said opposite edge to blow away the flames tending to overheat said opposite edge.

5. Apparatus for heating surfaces of differing widths, comprising means for producing a plurality of heating flames disposed in a row extending transversely of said surface from a point closely adjacent one edge of said surface to a point normally beyond the opposite edge of said surface and applied to successive portions of said surface; means for directing a jet of gaseous fluid substantially perpendicularly to the flames adjacent said opposite edge to blow away the flames tending to overheat said opposite edge; means for maintaining one end of said row of flames spaced slightly from one edge of said surface to prevent overheating said edge; and means for maintaining said gaseous fluid jet in a position corresponding to the opposite edge of said surface.

6. Apparatus as defined in claim 5, including means for effecting a relative movement between said flames and said surface in a direction transversely of said surface to cause said flames to follow the contour of said edge, and means for effecting a relative movement between said gaseous fluid jet and the opposite edge of said surface to cause said jet to follow the contour of said opposite edge.

7. Apparatus for heating metal surfaces of differing widths comprising a heating head having outlets for discharging a plurality of heating flames disposed in at least one row and extending for a distance greater than the width of at least some of the surfaces to be treated; a head for directing a jet of gaseous fluid at a sufficient angle to at least some of said flames to blow said flames away from said surface; means for positioning said flame head with one end of said row of flames positioned relatively to one edge of said surface to prevent overheating said edge; and means for supporting said jet head in a position relative to said flame head and the opposite edge of said surface that flames tending to overheat said opposite edge of said surface are blown away from said surface.

8. Apparatus for heating metal surfaces of different widths, as defined in claim 7, including riding means connected with said heating head to maintain said heating head positioned relatively to one edge of said surface, and an adjustable connection between said jet head and said heating head.

9. Apparatus for heating a surface of varying width comprising a heating head having outlets for discharging a plurality of heating flames disposed in at least one row and extending for a distance as great as the widest portion of the surface to be treated; a head for directing a jet of air at a sufficient angle to at least some of said flames to blow said flames away from said surface; means for positioning said flame head with one end of said row of flames positioned relatively to said surface to prevent overheating one edge thereof and for causing said head to follow the contour of said edge; and means for supporting said jet head in a position relative to the opposite edge of said surface and for causing said jet head to follow the contour of said opposite edge so that flames which tend to overheat said opposite edge are blown away from said opposite edge.

10. Apparatus as defined in claim 9, in which said means for supporting said jet head and for causing said jet head to follow the contour of said opposite edge comprises a rider engaging a surface of said article adjacent said opposite edge, and resilient means connecting said jet head and said heating head.

FRANK McGUIRE, Jr.